United States Patent
Li et al.

(10) Patent No.: US 12,204,523 B2
(45) Date of Patent: Jan. 21, 2025

(54) RETRIEVAL AND CACHING OF OBJECT METADATA ACROSS DATA SOURCES AND STORAGE SYSTEMS

(71) Applicant: Databricks, Inc., San Francisco, CA (US)

(72) Inventors: Zhaoxing Li, Mountain View, CA (US); Rayman Preet Singh, Livermore, CA (US); Fuat Can Efeoglu, San Francisco, CA (US); Daniel Tenedorio, Belmont, CA (US); Sarah Cai, Cupertino, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/135,078

(22) Filed: Apr. 14, 2023

(65) Prior Publication Data
US 2024/0346007 A1    Oct. 17, 2024

(51) Int. Cl.
*G06F 16/00*        (2019.01)
*G06F 16/23*        (2019.01)
*G06F 16/2455*      (2019.01)

(52) U.S. Cl.
CPC .... *G06F 16/2365* (2019.01); *G06F 16/24552* (2019.01)

(58) Field of Classification Search
CPC .............. G06F 3/0619; G06F 11/3034; G06F 12/0802; G06F 12/0866; G06F 12/0895; G06F 12/0897; G06F 12/1081; G06F 12/123; G06F 16/13; G06F 16/164; G06F 16/172; G06F 2201/84; G06F 2212/1024; G06F 2212/154; G06F 2212/163; G06F 2212/263; G06F 2212/311; G06F 2212/466; G06F 11/1435; G06F 16/907; G06F 16/2453; G06F 16/9535; G06F 12/0246; G06F 3/0679; G06F 3/061; G06F 3/065; G06F 3/067; G06F 12/10; G06F 16/219; G06F 16/27; G06F 16/00; G06F 16/211; G06F 8/654; G06F 3/00; G06F 9/46; G06F 9/541; G06F 16/128; G06F 16/18; G06F 11/201; G06F 12/121
See application file for complete search history.

(56) References Cited

U.S. PATENT DOCUMENTS

2012/0150996 A1 * 6/2012 DuBois ............... H04L 67/06
                                                    709/217
2022/0269417 A1 * 8/2022 Sanvido ............... G06F 3/0608

* cited by examiner

*Primary Examiner* — Shyue Jiunn Hwa
(74) *Attorney, Agent, or Firm* — Fenwick & West LLP (57) ABSTRACT

A system for retrieving and caching metadata from a remote data source is described. The system may receive a request from a client device. The request is to perform a query operation on a set of data objects stored in the remote data source. The system may access a metadata cache storing metadata information on one or more data objects of the remote data source and identify metadata corresponding to the set of data objects for the query operation in the metadata cache. The system may determine whether the identified metadata for the set of data objects meets an update condition. In response to the identified metadata meeting the update condition, the system may fetch updated metadata for at least the set of data objects from the remote data source, and store the updated metadata in the metadata cache.

17 Claims, 8 Drawing Sheets

RETRIEVAL AND CACHING OF OBJECT METADATA ACROSS DATA SOURCES AND STORAGE SYSTEMS

TECHNICAL FIELD

This disclosure relates generally to data storage technology, and more particularly to retrieving and caching object metadata.

BACKGROUND

A data processing service may manage a significant amount of data for one or more entities in various forms, such as raw data or data tables. Users access the data processing service to perform operations (e.g., a query operation) on the data. To return the results of the operations to the users, the data processing service may need to access remote data sources, which often causes network overhead and overload on the remote data sources. The overhead and load grow linearly with the number of queries, users, and clusters being used by the data processing system.

The figures depict various embodiments of the present embodiments for purposes of illustration only. One skilled in the art will readily recognize from the following discussion that alternative embodiments of the structures and methods illustrated herein may be employed without departing from the principles described herein.

DETAILED DESCRIPTION

Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The disclosed configurations beneficially provide a system (and/or a method) for fetching and caching metadata for data stored in data storage systems. In one instance, the metadata is for data stored in an external or remote data storage system. The system may receive a request from a client device to perform a query operation on a set of data objects stored in the remote data source. The system may access a metadata cache storing fetched metadata information on one or more data objects of the remote data source and identify metadata corresponding to the set of data objects for the query operation in the metadata cache. The system may determine whether the identified metadata for the set of data objects meets an update condition. In response to the identified metadata meeting the update condition, the system may fetch updated metadata for at least the set of data objects from the remote data source, and store the updated metadata in the metadata cache. If the identified metadata does not meet the update condition, the system may use the identified metadata to verify the requested query and perform the query operation.

The disclosed configuration addresses the problem of retrieving object metadata from remote data sources, in a way that reduces network overhead, reduces query load on the remote data sources, reduces chances of inconsistency between the metadata cache and remote data sources, and allows users to control the degree of inconsistency. By using the prefetched metadata, the configuration reduces metadata-query load on a remote data source, and allows operators to control it as desired. It also reduces query latency by leveraging usage-statistics from remote data sources to pre-fetch metadata objects, thereby reducing query-planning and analysis time, especially in scenarios where the query engine and remote warehouses are geographically distributed. In addition, the configuration allows network overhead and remote data source query load for metadata to scale with the number of metadata objects, and not with the number of queries, users, and compute clusters. Further, by updating the cached metadata, the configuration improves consistency of reads on metadata, ranging from strongly consistent reads to eventual consistent reads.

Figure 1:
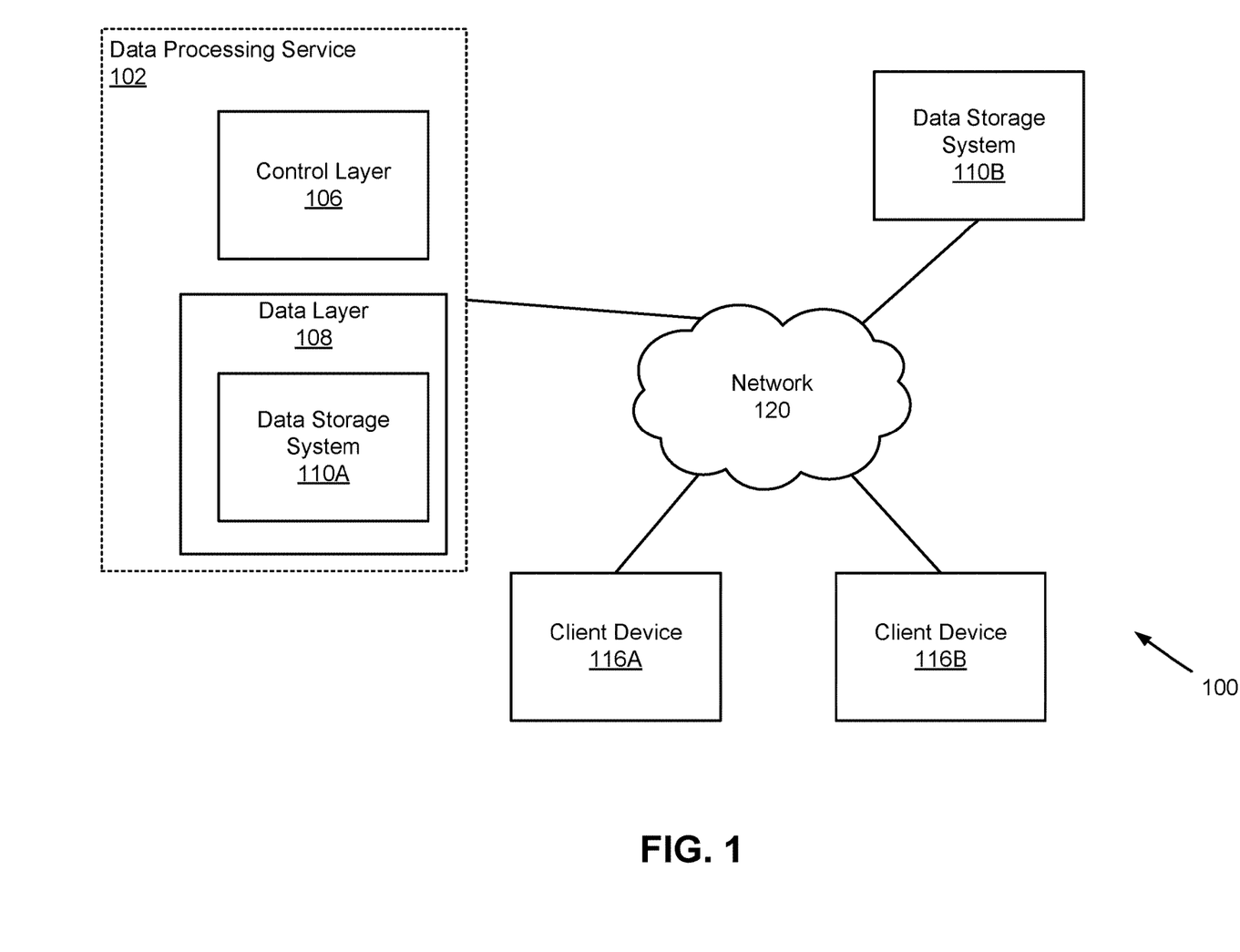
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B (collectively referred to as "client device(s) 116" hereinafter), a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in relation to FIG. 4. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the components of the data processing service 102 are configured to receive instructions to execute one or more queries on data external to the data processing service 102, for example, data objects stored in an external or remote data storage system. Responsive to receiving a query request, the data processing service 102 may retrieve metadata of the data objects from the external data storage system, verify that the requested query can be executed on the data object, and execute the query by accessing the data objects in the external data storage system. In one instance, as described in detail below, to reduce metadata query load on such requests, the data processing service 102 maintains a metadata cache that stores metadata on the external data objects.

The data storage system 110 includes a device (e.g., a disc drive, a hard drive, a semiconductor memory) used for storing data objects and metadata (e.g., a stored data set, portion of a stored data set, data records, metadata corresponding to the data objects, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

For example, when the data storage system 110 is managed by the entity managing the data processing service 102, the data storage system 110A may reside within the data layer 108. The data storage system 110A may include dedicated cloud storage for respective tenants of the data processing service 102. In another instance, the data storage system 110B may be external and/or remote to the data processing service 102 in that a different entity manages the data of the data storage system 110B. For example, the data storage system 110B may be located in a remote location from the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 102 via the network 120. In another embodiment, the client device 116 interacts with the various systems of the system environment 100 through an application programming interface (API) running on a native operating system of the client device 116, such as IOS® or ANDROID™.

Figure 2:
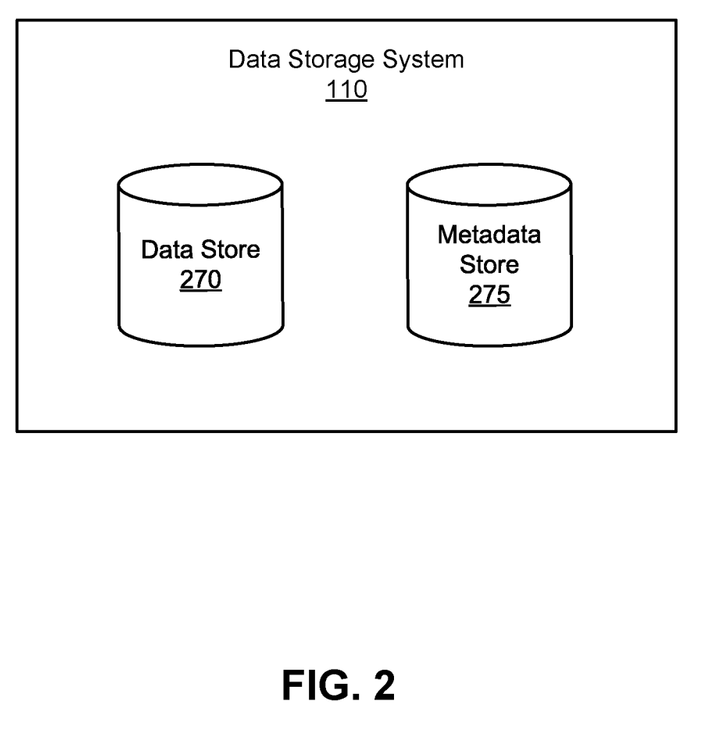
FIG. 2 illustrates a block diagram of an architecture of a data storage system, in accordance with an embodiment.

FIG. 2 is a block diagram of an architecture of a data storage system 110, in accordance with an embodiment. The data storage system 110 also includes a data store 270 and a metadata store 275. The data storage system 110 stores data in the data store 270 and the corresponding metadata in the metadata store 275.

The data store 270 stores data associated with different tenants of the data processing service 102. In one embodiment, the data in data store 270 is stored in a format of a data table. The data table may be a collection of structured data. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. The metadata may define and organize the data table. In one instance, the metadata may include structural or type information of the corresponding data table. For example, the metadata may indicate the number of rows, columns the corresponding data table includes and/or the information of the data included in certain rows/columns, such as author, date created, date modified, file size, etc. In some embodiments, the metadata may include a three-level namespace, which organizes data into hierarchical levels, such as catalog, schema, and table. In some embodiments, every table is associated with a schema, and every schema is associated with a catalog.

Figure 3:
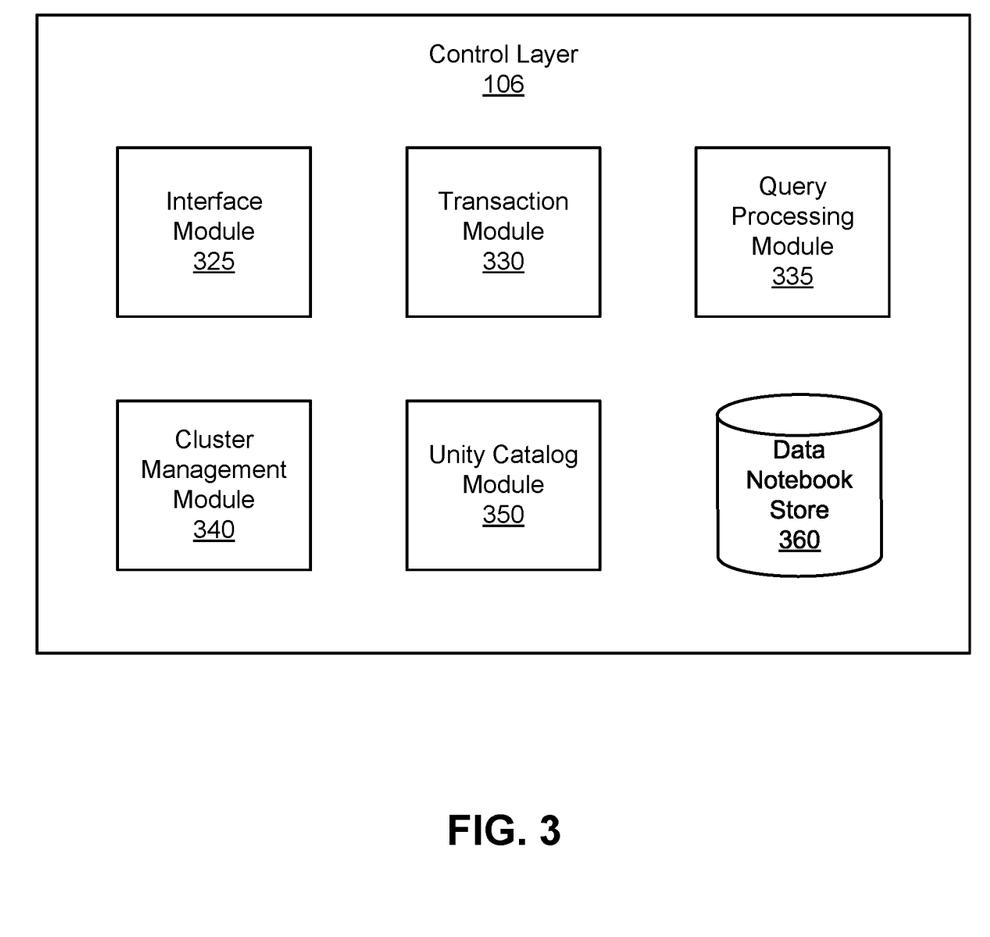
FIG. 3 illustrates a block diagram of an architecture of a control layer, in accordance with an embodiment.

FIG. 3 is a block diagram of an architecture of a control layer 106, in accordance with an embodiment. In one embodiment, the control layer 106 includes an interface module 325, a transaction module 330, a query processing module 335, a cluster management module 340, and a unity catalog module 350. In some embodiments, the control layer 106 also includes a data notebook store 360.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed. In one embodiment, the queries received by the query processing module 335 are queries to data objects stored in remote data storage systems. The query processing module 335 may coordinate clusters residing with the control layer 106 or the data layer 108 to execute queries on the remote sources.

The unity catalog module 350 provides access control, auditing, lineage, and other data discovery capabilities across one or more workspaces of the data processing service 102. In one embodiment, the unity catalog module 350 maintains a metadata cache that stores fetched metadata (e.g., fetched by the clusters of the data layer 108) on data objects of a remote data storage system. The unity catalog module 350 is configured to partition the fetched metadata and store the fetched metadata in a metadata cache. In some embodiments, the metadata cache is stored at the control layer 106 that is different from a cluster in the cluster computing system 402 that fetches the metadata. In one example, for a given data table (e.g., with name "tableA_remoteSource") stored in a remote data storage system, the metadata cache may store a size of the table, names of columns (e.g., user_ID, timestamp, loginID) of the data table, and the like. This metadata may be "foreign" in the sense that the data objects that are the subject of a query may be managed by a different entity than the data processing service 102. Thus, in order to execute the query, the clusters instructed to execute the query may need to provide credentials or other types of access control to the remote data storage system before executing the query (e.g., metadata query or data query) to verify that the user initiating the request has authorization to do so.

In one instance, the unity catalog module 350 partitions the metadata using a three-level namespace, e.g., catalog, schema, and table. The level of table corresponds to a data table, a view or a function. A view stores the text for a query typically against one or more data sources or tables in the data storage system 110. Functions associate user-defined logic with a database and may be used to aggregate data. The level of schema (also referred to as "database"), corresponding to a group of data objects, is the second level of the hierarchy. In some example, the schema may organize data objects, such as tables, view, and functions. The level of catalog corresponds to a group of schemas. In some implementations, every table is associated with a schema, and every schema is associated with a catalog. The metadata cache also partitions metadata obtained for the remote data objects in this hierarchical manner, such that read/write latency is reduced. Therefore, the metadata cache may also organize metadata according to this namespace hierarchy.

The unity catalog module 350 may associate each metadata entry in the metadata cache with one or more parameters including last update timestamp, update identifier (e.g., a cluster ID), and update start time. The last update timestamp is a timestamp attached to or embedded in each metadata entry, indicating the time when the metadata entry is last updated. Each cluster may include an identifier. In some embodiments, the identifier may be a universal unique identifier (UUID), or any type of identifier that may be used to identify a cluster. In some examples, the identifier may be a cluster ID. For each metadata entry, the unity catalog module 350 may designate a cluster for updating the metadata with its identifier, e.g., an update cluster ID. In one example, only the designated cluster with the update cluster ID fetches the corresponding metadata from a data source to update the cached metadata. In some embodiments, the unity catalog module 350 may set an update start time indicating the time when a cluster starts to update a metadata entry. In this way, the unity catalog module 350 may also configure a refresh deadline for the cluster to complete the update. For example, a refresh deadline may be set as 10 minutes. A cluster may take 10 minutes to update the metadata before another cluster can take over the update on the metadata.

In some embodiments, the unity catalog module 350 may configure a time to live (TTL) as an update condition for updating the metadata. TTL refers to the amount of time that metadata is set to exist before being re-fetched/updated, i.e., a time limit between two successive updates. For example, a TTL may be set to be as a preset value, e.g., 2 minutes, then the metadata is updated every 2 minutes. A higher TTL may indicate a weaker consistency between the cached metadata and the current metadata from the data source, but a less load to the remote source and a smaller network overload. TTL may be implemented as a timestamp attached to or embedded in the metadata. Once the prescribed event count or timespan has elapsed, the metadata is discarded and/or re-fetched. For example, the unity catalog module 350 may determine the TTL has expired and instruct a cluster to update the metadata. If the TTL has not expired, the cluster may use the cached metadata to perform the query operation.

Figure 4:
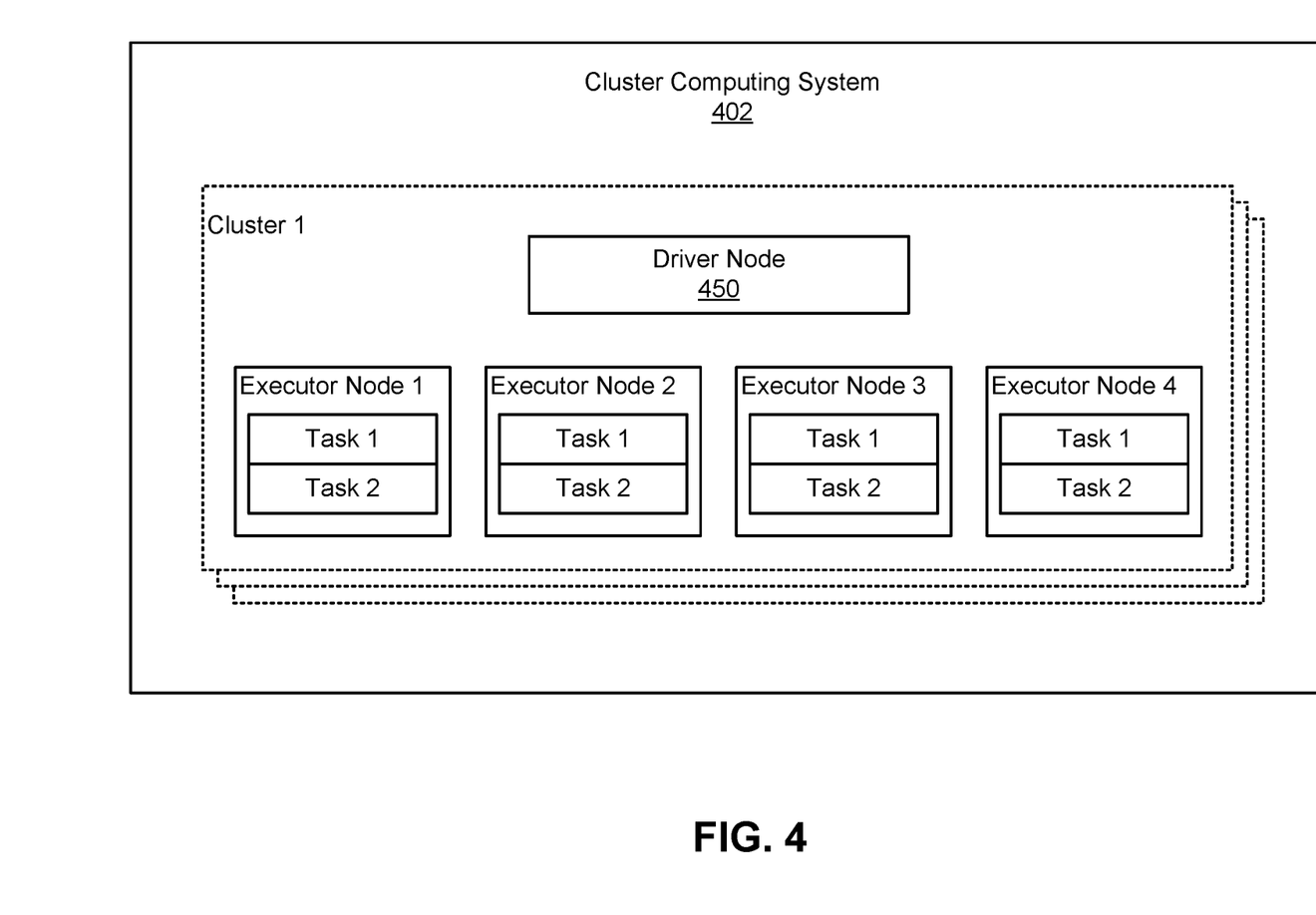
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Retrieving and Caching Metadata Via Unity Catalog Module

Figure 5:
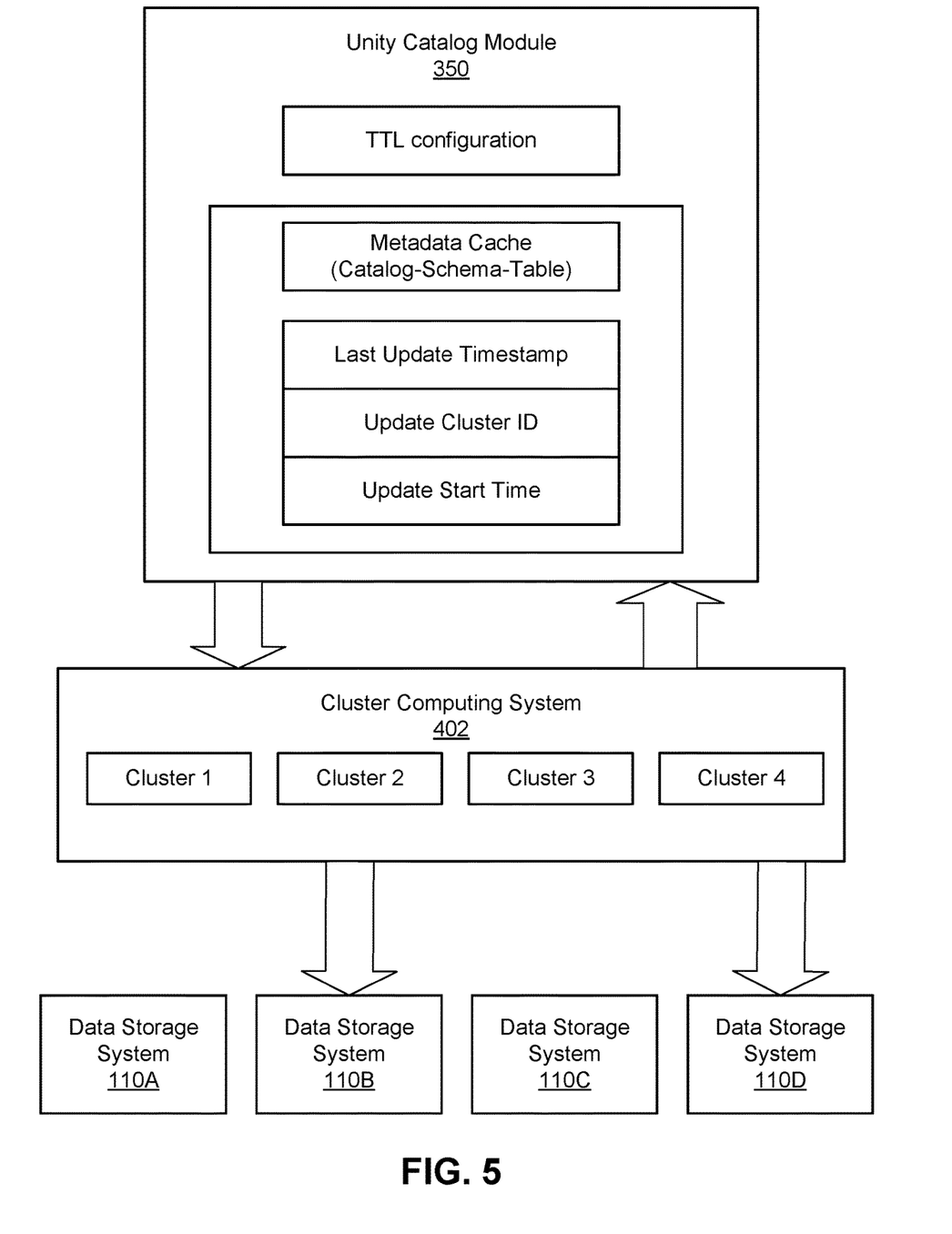
FIG. 5 illustrates a method of using a unity catalog module retrieving and caching metadata, in accordance with an embodiment.

FIG. 5 illustrates a method of using a unity catalog module retrieving and caching metadata, in accordance with an embodiment. As shown in FIG. 5, the unity catalog module 350 communicates with the cluster computing system 402 for executing one or more jobs. Each cluster shown in FIG. 5, for example, may have configurations with a set of executors and task engines, as described in conjunction with FIG. 4. The cluster computing system 402 may include one or more clusters, each having an identifier, e.g., a cluster ID (Cluster 1, Cluster 2, Cluster 3, Cluster 4, etc.). While four clusters are illustrated in FIG. 5, in practice many clusters may communicate with the unity catalog module 350. In some embodiments, the jobs may include fetching metadata from a data storage system. In some embodiments, the jobs may include executing a query operation based on the cached metadata. The cluster computing system 402 may communicate with one or more data storage systems, e.g., 110A, 110B, 110C, and 110D. While four data storage systems are illustrated in FIG. 5, in practice many data storage systems may communicate with the cluster computing system 402.

1. Reading the Metadata Cache for External Queries

When the data processing service 102 receives a request to perform a query operation on a set of data objects, the unity catalog module 350 may access the metadata cache to identify the metadata that corresponds to the set of data objects. If the corresponding metadata is fetched and cached in the metadata cache, then the unity catalog module 350 may determine whether the identified metadata for the set of data objects meets an update condition. In some embodiments, the unity catalog module 350 may determine that the identified metadata does not meet the update condition, which indicates the metadata does not need to be updated at the moment.

The cluster computing system 402 may determine whether the identified metadata for the data objects are consistent with the query operation. For example, the query may specify to add values for Col. 1 and Col. 2 for the data objects, and the cluster computing system 402 may determine whether the identified metadata does indicate that the data objects have corresponding column names that match those in the query.

The cluster computing system 402 may perform the query operation on the set of data objects and obtain a result of the query operation from remote data source (e.g., data storage systems 110A, 110B, 110C, 110D, etc.). In this way, the data processing service 102 does not need to retrieve the metadata from the data source every time it receives a query operation request from a client device. The query latency can be minimized or reduced, thus reducing query-planning and analysis time, especially in scenarios where the data processing service 102 and remote data sources are geographically distributed.

2. Writing and/or Updating the Metadata Cache

In some embodiments, based on the cache retrieval results of the metadata cache, the unity catalog module 350 may determine that a particular metadata entry has to be written or updated. In one embodiment, the unity catalog module 350 may determine that the identified metadata meets the update condition and instruct a cluster to update the metadata. In one embodiment, the unity catalog module 350 may further determine whether the identified metadata is consistent with the query operation for the set of data objects. For example, the query operation may query for data records of user login account. The identified metadata, although does not meet the update condition, does not include the information that corresponds to the queried data records. In this case, the unity catalog module 350 may instruct a cluster to update the identified metadata for performing the query operation since this likely indicates that the metadata has been updated for the data object and the information in the metadata cache is outdated. Thus, a metadata for a particular data object may be written or updated in the metadata cache when the update condition is satisfied, or when the metadata for the data object of the query cannot be found in the metadata cache or is inconsistent with the query operation.

For example, the unity catalog module 350 may identify a cluster with an update cluster ID, and request the identified cluster to update the metadata from the data source if any of the above scenarios occur. In some embodiments, after the metadata meets the update condition, the first cluster that accesses the unity catalog module 350 to perform a query operation associated with the metadata, is determined as the cluster to update the metadata. In one implementation, only the identified cluster with the update cluster ID fetches the corresponding metadata from a data source to update the cached metadata. Only one cluster updates one data entry at a time to reduce query load on the data source. For a given set of data objects, the metadata cache may specify one or more parameters of data, including but not limited to, when the metadata for the data object was last updated (e.g., 11:48 AM on Mar. 24, 2023), the cluster ID (e.g., uswest2_3849), and when the update started. However, it is appreciated that the parameters may include any other type of information related to the metadata.

In one embodiment, as described in conjunction with the unity catalog module 350 of FIG. 3, each entry may include the metadata in the three-level namespace, i.e., catalog, schema, and table. As described above, a catalog may include a set of schemas, a schema may include a set of tables, and a table may include on or more records of data. While the actual data stored in a remote data source such as a remote data storage system may not organize the data in this particular manner, the unity catalog module 350 may organize the metadata for a set of data objects in the metadata cache to reflect a hierarchical namespace organization that is used by the data processing system 102 in order to improve read/write latency times.

For example, the metadata for a catalog may include the names of the schemas that are part of the catalog, the metadata for a schema may include the names of the tables that are part of the schema, and the metadata for a table may include one or more feature and/or column names that are part of the table. For example, the metadata of a data object of a remote data source considered to be a table within this hierarchical namespace may include a set of column names that are a part of the data object, as well as a corresponding schema, a corresponding catalog of the remote data source that includes the data object.

In one example, when the metadata in the metadata cache is partitioned according to a hierarchical namespace, the designated cluster pre-fetches the whole partition when fetching metadata for a data object. For example, the designated cluster may pre-fetch the entire catalogs, schemas and tables of the corresponding metadata according to the remote and local data to further minimize or reduce query-fetching trips. For example, for a data object that is a table, when it is determined that a cluster should fetch the metadata for the data object for update to the metadata cache, the cluster may pre-fetch metadata for other tables that are considered to be in the same schema as the table. In this manner, the cluster can save future I/O costs on the network to retrieve metadata for the other data objects in a partition of the namespace.

In another example, the unity catalog module 350 may set an update start time when a cluster starts to update the metadata and a refresh deadline for the cluster to complete the update. The refresh deadline, e.g., 10 minutes, may be a maximum time before another cluster can take over the update on the metadata. Once the cluster fetches the updated metadata, the metadata cache stores the updated metadata, and the cluster computing system 402 execute, based on the updated metadata, the query operation to obtain a result of the query operation from the data source as described above.

In some embodiments, the update condition may be configured based on user's consistency requirements. The more frequently the metadata gets updated, the more consistent is between the cached metadata and the current metadata from the data source. The unity catalog module 350 may also configure the update condition by navigating the tradeoff between using cached metadata or direct retrieval while minimizing or reducing the network overhead and query load on the metadata store 275.

In one example, the unity catalog module 350 may configure TTL as an update condition for updating the metadata. For example, a TTL may be set to be as a preset value, e.g., 2 minutes, then the metadata is updated every 2 minutes. In another example, the unity catalog module 350 may determine the TTL has expired and instruct a cluster to update the metadata. If the TTL has not expired, the unity catalog module 350 may directly use the cached metadata to perform the query operation. In some embodiments, the unity catalog module 350 may determine a refresh interval between the current timestamp and the last update timestamp. If the refresh interval is larger than the TTL, the unity catalog module 350 will proceed to updating the cached metadata before using the metadata for performing the query operation.

For example, when the data processing service 102 identifies the cached metadata, the unity catalog module 350 may determine whether the identified metadata meets the update condition. If the unity catalog module 350 determines the refresh interval of the identified metadata exceeds the TTL, the unity catalog module 350 communicates with a cluster to fetch the metadata from the data source to update the metadata. In some cases, the metadata may be not automatically updated until the data processing service 102 receives a query operation which triggers the update condition. However, it is appreciated that in other embodiments, the update condition may be any condition that is appropriate for indicating when the metadata in the metadata cache should be updated to improve latency but also maintain consistency with changes to the metadata for remote data sources.

While FIG. 5 illustrates two requests for the sake of simplicity, in some embodiments, the data processing service 102 may receive a plurality of requests to perform a plurality of query operations at the same time. The number of requests received may be significantly large. The unity catalog module 350 may access the metadata cache to identify the metadata that corresponds to each of the query operation and determine whether any identified metadata meets an update condition. In some embodiments, the unity catalog module 350 may determine that one or more identified metadata meet their corresponding update conditions. In some embodiments, the unity catalog module 350 may determine that a particular metadata corresponds to one or more data objects for one or more query operations at the same time. The unity catalog module 350 then instructs one or more clusters to update the one or more identified metadata that meet their update conditions. In one implementation, the unity catalog module 350 instructs only one cluster to update each metadata at a time to reduce query load on the data source. In some example, only the identified cluster with the update cluster ID fetches the corresponding metadata from a data source to update the cached metadata. Once the metadata is updated, the unity catalog module 350 may instruct the clusters to share the updated metadata to perform the corresponding query operations and return the query results to each of the client devices 116. In this way, the unity catalog module 350 coordinates the clusters to fetch metadata from the remote data sources, reducing the number of concurrent fetches, thus reducing the network overhead and resource/time spent, in particular for cases where many query requests are received.

Figure 6:
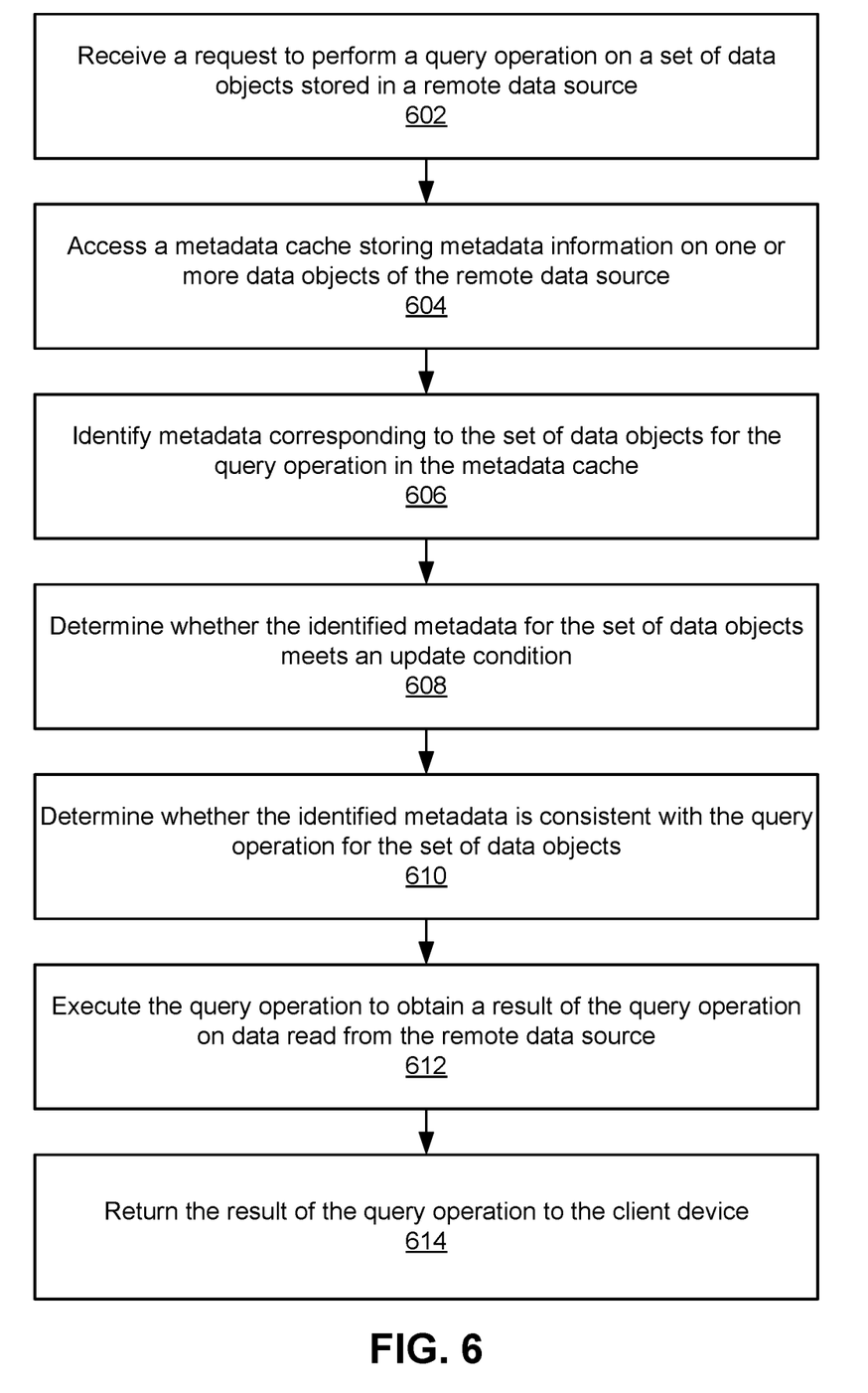
FIG. 6 illustrates a flow chart of a method for retrieving and caching metadata, in accordance with an embodiment.

FIG. 6 is a flow chart of a method for retrieving and caching metadata, in accordance with an embodiment. The process shown in FIG. 6 may be performed by one or more components (e.g., the cluster computing system 402 and the unity catalog module 350) of a data processing system/service (e.g., the data processing service 102). Other entities may perform some or all of the steps in FIG. 6. The data processing service 102 as well as other entities may include some or of the component of the machine (e.g., computer system). Embodiments may include different and/or additional steps, or perform the steps in different orders.

The data processing service 102 receives 602 a request from a client device to perform a query operation on a set of data objects stored in a remote data source. The data processing service 102 may access 604 a metadata cache storing metadata information on one or more data objects of the remote data source. The metadata cache is located at remote location from the remote data source. The stored metadata information may be pre-fetched and stored at the metadata cache. The data processing service 102 may identify 606 the metadata corresponding to the set of data objects for the query operation in the metadata cache, and determine 608 whether the identified metadata for the set of data objects meets an update condition. The update condition may include a refresh interval indicating a time limit between two successive updates of the metadata. The data processing service 102 may determine that the refresh interval does not exceed a preset value and the metadata does not meet the update condition. The data processing service 102 may further determine 610 whether the identified metadata is consistent with the query operation for the set of data objects. In response to that the identified metadata does not meet the update condition and is consistent with the query operation, the data processing service 102 may execute 612 the query operation to obtain a result of the query operation from the remote data source. The data processing service 102 then returns 614 the result of the query operation to the client device.

Figure 7:
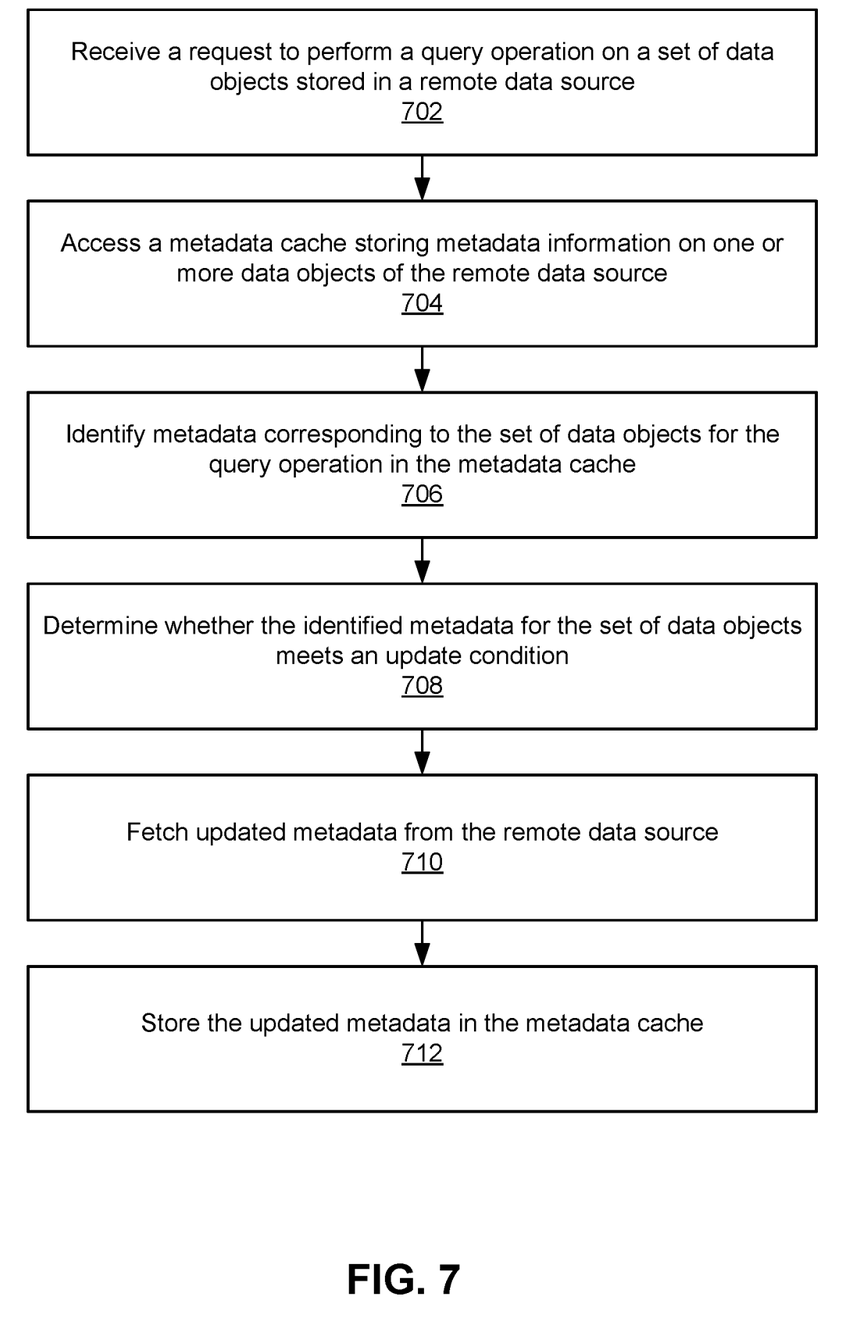
FIG. 7 illustrates a flow chart of another method for retrieving and caching metadata, in accordance with an embodiment.

FIG. 7 is a flow chart of another method for retrieving and caching metadata, in accordance with an embodiment. The process shown in FIG. 7 may be performed by one or more components (e.g., the cluster computing system 402 and the unity catalog module 350) of a data processing system/service (e.g., the data processing service 102). Other entities may perform some or all of the steps in FIG. 7. The data processing service 102 as well as other entities may include some or of the component of the machine (e.g., computer system). Embodiments may include different and/or additional steps, or perform the steps in different orders.

The data processing service 102 may receive 702 a request from a client device to perform a query operation on a set of data objects stored in a remote data source. The data processing service 102 may access 704 a metadata cache storing metadata information on one or more data objects of the remote data source. The metadata cache is located at remote location from the remote data source. The stored metadata information may be pre-fetched and stored at the metadata cache. The data processing service 102 may identify 706 the metadata corresponding to the set of data objects for the query operation in the metadata cache, and determine 708 whether the identified metadata for the set of data objects meets an update condition. The update condition may include a refresh interval indicating a time limit between two successive updates of the metadata. The data processing service 102 may determine that the refresh interval exceeds a preset value and the metadata meets the update condition. Responsive to the identified metadata meeting the update condition, the data processing service 102 may fetch 710 the updated metadata for at least the set of data objects from the remote data source. The data processing service 102 stores 712 the updated metadata in the metadata cache. The data processing service 102 may execute the query operation, based on the updated metadata to obtain a result of the query operation from the remote data source. The data processing service 102 then returns the result of the query operation to the client device. In some embodiments, the data processing service 102 may further determine whether the identified metadata is consistent with the query operation for the set of data objects. In response to that the identified metadata is not consistent with the query operation, the data processing service 102 may fetch the metadata for at least the set of data objects from the remote data source.

Figure 8:
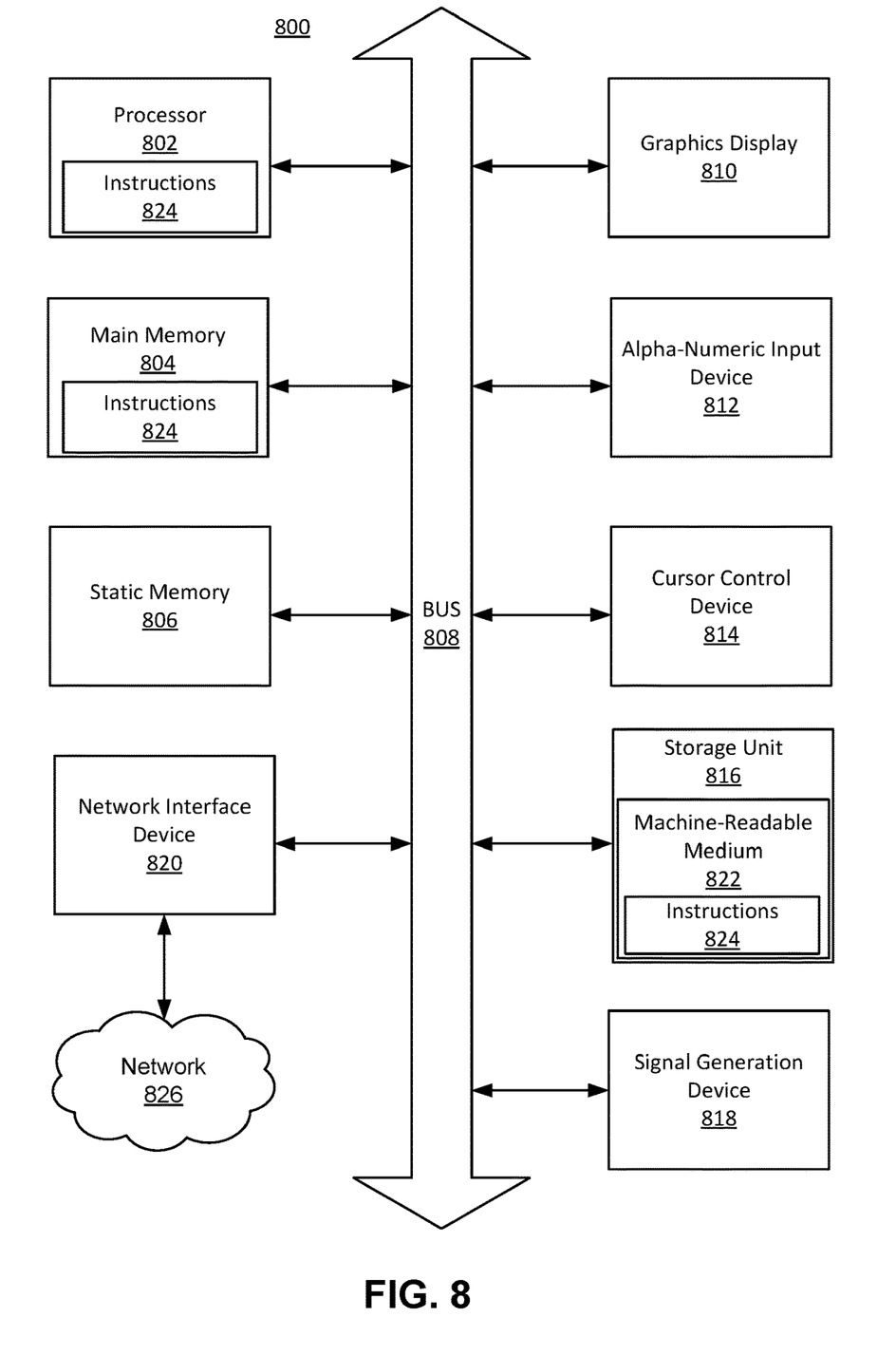
FIG. 8 is a block diagram illustrating an example machine to read and execute computer readable instructions, in accordance with an embodiment.

FIG. 8 is an example machine to read and execute computer readable instructions, in accordance with an embodiment. Specifically, FIG. 8 shows a diagrammatic representation of the data processing service 102 (and/or data processing system) in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 800. The computer system 800 also includes a main memory 804. The computer system may include a storage unit 816. The processor 802, memory 804, and the storage unit 816 communicate via a bus 808. The processor 802 may be one or more processors that may also be spread and operated across multiple physical devices. The program code may comprise instructions executable by the processor 802. The program code also may be referred to as software or a code snippet. The functionality of the modules and data processing described within this disclosure, e.g., with FIGS. 1 through 7, may be embodied as program code that provide the functionality described when executed by the processor 802.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include instructions for implementing the functionalities of the transaction module 330 and/or the concurrent management module 225. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826, such as the network 120, via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a system (and/or a method) for prefetching and caching metadata. The system may access a metadata cache storing prefetched metadata information on data objects of the remote data source and identify metadata corresponding to the data objects for the query operations received from a client device. The system may determine whether the identified metadata for the data objects meets an update condition. In response to the identified metadata meeting the update condition, the system may fetch updated metadata for the data objects from the remote data source, and store the updated metadata in the metadata cache. If the identified metadata does not meet the update condition, the system may directly use the identified metadata and perform the query operation. In this way, the disclosed configuration addresses the problem of retrieving object metadata from remote data sources, which minimizes network overhead, minimizes query load on the remote data sources, and minimizes chances of inconsistency between the metadata cache and remote data sources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the described embodiments. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method, implemented by a computing system, comprising:
    receiving, from a client device, a request to perform a query operation on a set of data objects stored in a remote data source, wherein the remote data source is remote from the computing system;
    prior to accessing the set of data objects in the remote data source,
    accessing a metadata cache storing metadata of one or more data objects, the metadata cache located at the computing system, and the metadata describing information of the one or more data objects stored in the remote data source;
    identifying metadata corresponding to the set of data objects for the query operation in the metadata cache;
    determining whether the identified metadata for the set of data objects meets an update condition, the update condition including a refresh interval indicating a time limit between two successive updates of the metadata;
    fetching, responsive to the identified metadata meeting the update condition, updated metadata for at least the set of data objects from the remote data source; and
    storing the updated metadata in the metadata cache; and
    performing, using the updated metadata, the query operation on the set of data objects.

2. The method of claim 1, wherein the metadata in the metadata cache is fetched from the remote data source and the metadata cache is stored at a computing resource of the computing system, and the computing resource is different from a cluster that fetches the metadata.

3. The method of claim 1, wherein determining whether the metadata meets the update condition comprises:
    determining whether the refresh interval exceeds a preset value; and
    determining, responsive to the refresh interval exceeding the preset value, that the metadata meets the update condition.

4. The method of claim 1, wherein fetching updated metadata for at least the set of data objects from the remote data source comprising:
    identifying a cluster identifier configured to fetch the updated metadata from the remote data source; and
    sending a request to the identified cluster based on the cluster identifier, causing the identified cluster to fetch the updated metadata from the remote data source.

5. The method of claim 1, wherein the metadata cache stores the metadata according to a hierarchical namespace.

6. The method of claim 1, further comprising:
    receiving, from the client device, a second request to perform a second query operation on a second set of data objects stored in the remote data source;
    accessing the metadata cache storing metadata information on the one or more data objects of the remote data source;
    identifying second metadata corresponding to the second set of data objects for the second query operation in the metadata cache;
    determining whether the identified second metadata for the second set of data objects meets the update condition; and
    executing, responsive to the identified second metadata not meeting the update condition, the second query operation based on the identified second metadata.

7. A non-transitory computer-readable medium comprising stored instructions that when executed by one or more processors of one or more computing devices, cause the one or more computing devices to:
    receive, from a client device, a request to perform a query operation on a set of data objects stored in a remote data source, wherein the remote data source is remote from the one or more computing devices;
    prior to access of the set of data objects in the remote data source,
    access a metadata cache that stores metadata of one or more data objects, the metadata cache located at the one or more computing devices, and the metadata describing information of the one or more data objects stored in the remote data source;
    identify metadata corresponding to the set of data objects for the query operation in the metadata cache;
    determine whether the identified metadata for the set of data objects meets an update condition, the update condition including a refresh interval indicating a time limit between two successive updates of the metadata;
    fetch updated metadata for at least the set of data objects from the remote data source when the identified metadata meets the update condition; and
    store the updated metadata in the metadata cache; and
    perform, using the updated metadata, the query operation on the set of data objects.

8. The non-transitory computer-readable medium of claim 7, wherein the metadata in the metadata cache is fetched from the remote data source and the metadata cache is stored at a computing resource of the one or more computing devices, and the computing resource is different from a cluster that fetches the metadata.

9. The non-transitory computer-readable medium of claim 7, wherein the instructions to determine whether the metadata meets the update condition further comprise stored instructions executable by the one more processors to cause the one or more computing devices to:
  determine whether the refresh interval exceeds a preset value; and
  determine that the metadata meets the update condition when the refresh interval exceeds the preset value.

10. The non-transitory computer-readable medium of claim 7, wherein the instructions to fetch updated metadata for at least the set of data objects from the remote data source further comprise stored instructions executable by the one more processors to cause the one or more computing devices to:
  identify a cluster identifier configured to fetch the updated metadata from the remote data source; and
  transmit a request to the identified cluster based on the cluster identifier, causing the identified cluster to fetch the updated metadata from the remote data source.

11. The non-transitory computer-readable medium of claim 7, wherein the metadata cache stores the metadata according to a hierarchical namespace.

12. The non-transitory computer-readable medium of claim 7, wherein the instructions to perform query operations further comprise stored instructions executable by the one more processors to cause the one or more computing devices to:
  receive, from the client device, a second request to perform a second query operation on a second set of data objects stored in the remote data source;
  access the metadata cache storing metadata information on the one or more data objects of the remote data source;
  identify second metadata corresponding to the second set of data objects for the second query operation in the metadata cache;
  determine whether the identified second metadata for the second set of data objects meets the update condition; and
  execute the second query operation based on the identified second metadata when the identified second metadata does not meet the update condition.

13. A system comprising:
  one or more computer processors; and
  one or more computer-readable mediums storing instructions that, when executed by the one or more computer processors, cause the system to:
    receive, from a client device, a request to perform a query operation on a set of data objects stored in a remote data source, wherein the remote data source is remote from the system;
    prior to access of the set of data objects in the remote data source,
    access a metadata cache that stores metadata of one or more data objects, the metadata cache located at the system, and the metadata describing information of the one or more data objects stored in the remote data source;
    identify metadata corresponding to the set of data objects for the query operation in the metadata cache;
    determine whether the identified metadata for the set of data objects meets an update condition, the update condition including a refresh interval indicating a time limit between two successive updates of the metadata;
    fetch updated metadata for at least the set of data objects from the remote data source when the identified metadata meets the update condition; and
    store the updated metadata in the metadata cache; and
    perform, using the updated metadata, the query operation on the set of data objects.

14. The system of claim 13, wherein the metadata in the metadata cache is fetched from the remote data source and the metadata cache is stored at a computing resource of the system, the computing resource is different from a cluster that fetches the metadata.

15. The system of claim 13, wherein the instructions to determine whether the metadata meets the update condition further comprise stored instructions executed by the one or more computer processors to cause the system to:
  determine whether the refresh interval exceeds a preset value; and
  determine that the metadata meets the update condition when the refresh interval exceeds the preset value.

16. The system of claim 13, wherein the instructions to fetch updated metadata for at least the set of data objects from the remote data source further comprise stored instructions executed by the one or more computer processors to cause the system to:
  identify a cluster identifier configured to fetch the updated metadata from the remote data source; and
  transmit a request to the identified cluster based on the cluster identifier, causing the identified cluster to fetch the updated metadata from the remote data source.

17. The system of claim 13, wherein the metadata cache stores the metadata according to a hierarchical namespace.

* * * * *